Figure 1:
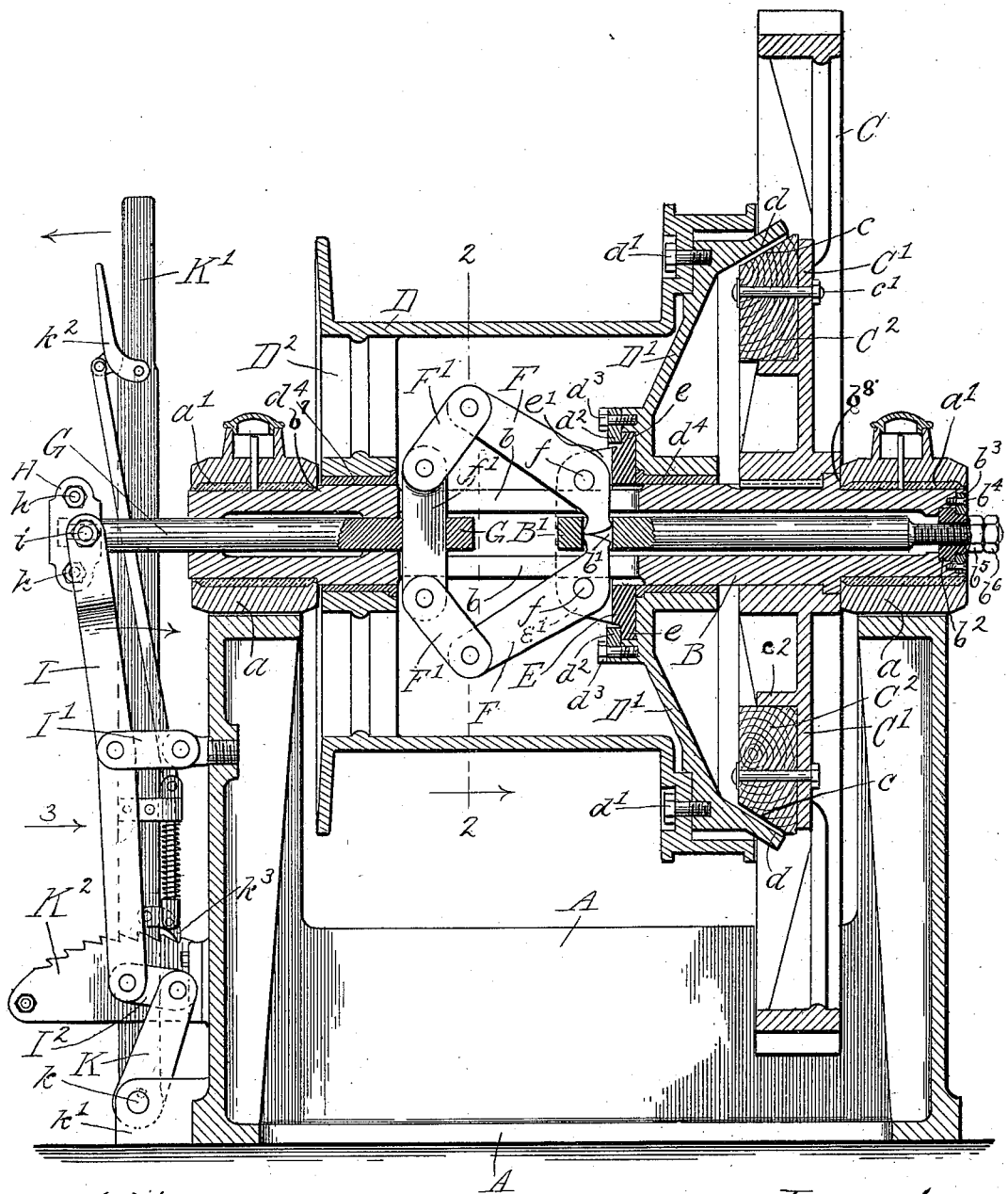

No. 617,419. Patented Jan. 10, 1899.
F. G. HOBART.
FRICTION CLUTCH.
(Application filed May 16, 1898.)

(No Model.) 2 Sheets—Sheet 1.

Witnesses:
J. Halpenny
D. E. Marsh.

Inventor:
Frank G. Hobart
by Carter & Graves
attys

No. 617,419. Patented Jan. 10, 1899.
F. G. HOBART.
FRICTION CLUTCH.
(Application filed May 16, 1898.)
(No Model.) 2 Sheets—Sheet 2.
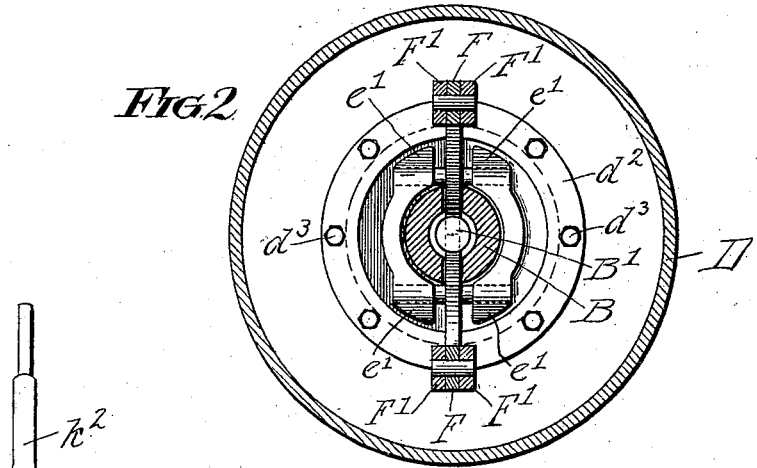//
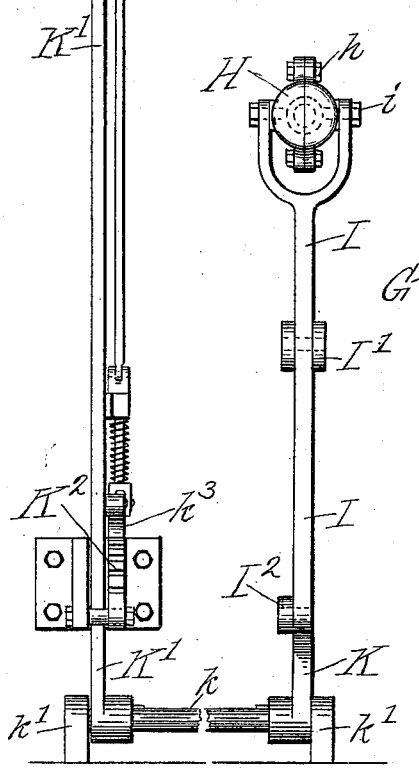
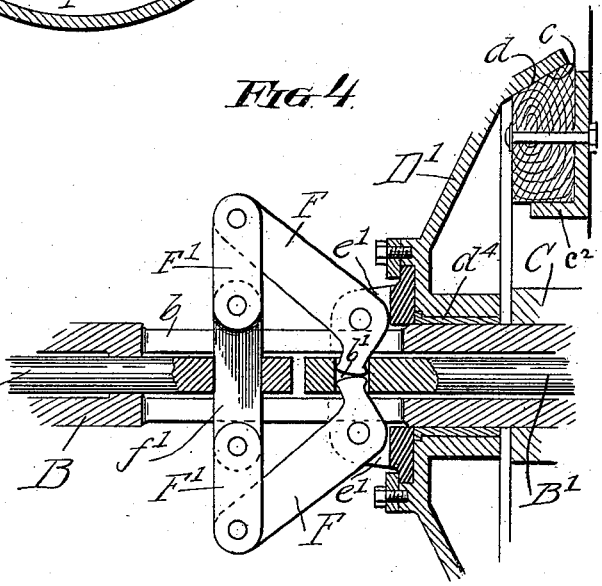
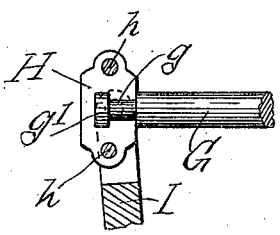
Witnesses:
J. Halpenny
D. E. Marsh
Inventor:
Frank G. Hobart
by Carter & Graves
Attys.
THE NORRIS PETERS CO., PHOTO-LITHO., WASHINGTON, D. C.

UNITED STATES PATENT OFFICE.

FRANK G. HOBART, OF BELOIT, WISCONSIN, ASSIGNOR TO THE FAIRBANKS, MORSE & COMPANY, OF CHICAGO, ILLINOIS.

FRICTION-CLUTCH.

SPECIFICATION forming part of Letters Patent No. 617,419, dated January 10, 1899.

Application filed May 16, 1898. Serial No. 680,807. (No model.)

*To all whom it may concern:*

Be it known that I, FRANK G. HOBART, of Beloit, in the county of Rock, in the State of Wisconsin, have invented certain new and useful Improvements in Friction-Clutches, of which the following is a specification.

This invention relates to improvements in friction-clutches, and in the particular form herein shown is especially designed and adapted for application between the power pulley or gear and the rope-drum of a power-hoist of that class in which the motor is kept running continuously, while the hoisting-drum is set in motion or stopped at will by means of clutch devices under control of the operator and by means of which operative connection between the drum and motor or driving-gear can be at any time established or broken. A hoist driven by a gasolene or other hydrocarbon motor is a familiar example of machines of this class. It will, however, be understood that the present invention relates solely to the clutch mechanism, considered both broadly and in its particular structural relations herein set forth, and has no connection with or relation to any particular type or form of motor or driving mechanism, and that the essential features of clutch construction embraced in the invention may be applied in the actuating connection between any two rotating parts, whether of a hoist or otherwise, to which they may be found adapted.

The invention consists in the matters herein set forth, and particularly pointed out in the appended claims, and will be fully understood from the following description of one form of construction in which it may be practically embodied.

In the accompanying drawings, Figure 1 is a sectional elevation of a power-hoist provided with a clutch mechanism constructed in accordance with my invention. Fig. 2 is a transverse section thereof, taken on line 2 2 of Fig. 1. Fig. 3 is an end elevation showing the clutch-shifting lever and connections. Fig. 4 is a fragmentary detail taken on the same section as Fig. 1, but showing the clutch members shifted to the position which they will occupy when moved to start the drum in rotation. Fig. 5 is a fragmentary detail of the swivel connecting the clutch-operating rod and its actuating-lever.

In said drawings, A designates a supporting-frame having bearings $a$, which receive the journals of the shaft B of the hoist. Near the bearing $a$ at one end a driving pulley or gear C is keyed or otherwise rigidly secured upon the shaft B to rotate therewith, and between this gear C and the other bearing $a$ is the hoisting-drum D, which is journaled on the shaft B so that it may revolve freely with relation to said shaft. The spider $D'$, which supports the inner end of the drum on the shaft, constitutes in this instance a slidable member of the clutch and is provided around its outer edge with a friction-surface $d$. The fixed member of the clutch (speaking with reference to its capacity for endwise movement along the shaft) is formed by the central flange or spider $C'$ of the driving-gear C and is provided with an annular friction-surface $c$, arranged closely adjacent to the friction-surface $d$ of the spider $D'$. For the purpose of insuring a large coefficient of friction between the surfaces $c$ and $d$ and of permitting the ready renewal and quick repair of worn parts the surface $c$ is herein shown as constructed of wood conveniently provided in the form of detachable wooden blocks $C^2$, that are secured to the flange $C'$ by bolts $c'$. An inner cylindric flange $c^2$ on the spider serves to center the blocks $C^2$ and to resist the centripetal force of the sliding clutch member $D'$ when pressed into contact with the blocks, the friction-surface $d$ being desirably, and as herein shown, made in the shape of the frustum of a hollow cone, which incloses the friction-surface $c$, so that when said surfaces are pressed together there is a resulting tendency of the blocks $C^2$ to be forced inward; but while this construction is deemed desirable and advantageous it will be understood that the friction-surfaces $c$ and $d$ may be made of other than conical shape without rendering the clutch in any way inoperative. The drum D is in this instance cast separate from its supporting-spider $D'$ and rigidly secured thereto by bolts $d'$, and the entire drum, together with the spider $D'$, is made to slide endwise on the shaft B sufficiently to move the surfaces c and d into or out of contact, as desired. My improved means for producing this endwise movement of the drum and spider are constructed as follows: E designates a slidable sleeve mounted on the shaft B adjacent to the spider D' and connected with said spider in such manner that the two parts must move endwise together, while capable of independent rotary movement. In this instance said sleeve is provided with a peripheral flange $e$, which fits within a counterbore in the spider D' and is inclosed therein by a ring $d^2$, which is detachably secured to the spider by bolts $d^3$, the parts being fitted sufficiently loose to permit said flange to rotate freely within the counterbore of the spider and behind its ring $d^2$. On the other end of the sleeve from the flange $e$ are projecting ears $e'$, between which a pair of levers F are pivotally mounted on pins $f$ diametrically opposite to each other. The inner ends of the levers F project into the shaft B through slots $b$ in said shaft, and at their points are given a bearing or fulcrum which is ordinarily fixed against longitudinal movement with relation to the shaft. The outer ends of said levers are provided with pivoted links F', which are in turn connected together, in this instance by pivotally engaging a common cross piece or bar $f'$, which extends through the slots $b$ of the shaft and can be moved endwise thereof. With this construction it will be obvious that by moving the connected ends of the links F' toward the sleeve E the outer ends of the levers F will be forced outward, and since their inner ends are fulcrumed in fixed relation to the shaft B, so far as endwise movement along the shaft is concerned, this outward movement of the levers must necessarily result in forcing the sleeve E along the shaft against the spider D', so as to bring the friction-surfaces $c$ and $d$ into contact and impart to the drum the rotary motion of the driving-gear. Then if the movement be reversed to draw the connected ends of the links F' away from the sleeve E the outer ends of the levers F will be drawn inward again and the sleeve E drawn back, and the engagement of the flange $e$ of the sleeve with the ring $d^2$ of the spider will draw back the latter so as to separate the friction-surfaces $c$ and $d$ and allow the drum to come to a stop.

It will be observed that the clutch-levers and links described constitute a toggle action, and that when the clutch is "thrown in" the links F' will be brought into alinement and form a lock against a separation of the friction-surfaces. The position of the parts under these circumstances is shown in Fig. 4, while Fig. 1 shows their position when the clutch is "thrown out."

As herein shown, the movement of the clutch members is accomplished at will by a rod G, which is mounted to slide endwise within an axial bore in the shaft B and which extends out of the shaft to engage a clutch-shifting mechanism. The inner end of the rod G is slotted to receive the cross-bar $f'$, which connects the links F', so that as said bar is moved in or out it accomplishes the shifting of the clutch in the manner hereinbefore described. Any suitable mechanism for thus moving the rod in or out may obviously be employed. As herein shown, a reduced neck $g$ is turned in the outer end of the rod, so as to leave a head $g'$, which is inclosed within a split box H, so as to rotate freely therein. The two parts of this box are secured together by bolts $h$, and the box as a whole is pivotally fastened by bolts $i$ within the forked end of a lever I, that is pivoted between its ends to a link I', that in turn is pivotally supported from the main frame A. At its lower end a link $I^2$ connects the lever I with a projecting arm K, that is rigidly secured to a rock-shaft $k$. This rock-shaft is journaled in suitable fixed bearings $k'$ of the main frame A and is rocked by a rigidly-attached hand-lever K', having a usual latch device $k^2$, controlling a pawl $k^3$, which may engage any one of a series of notches on a segment-bar $K^2$ to lock the parts in adjusted position. With this construction it will be obvious that by moving the hand-lever K' the clutch may be thrown in or out as desired.

While the only requirement as to the fulcrum-point of the inner ends of the levers F is that the same shall be fixed with relation to the shaft B when the parts are properly adjusted, yet for the purpose of permitting such adjustment to be accomplished readily and for convenience of construction it has been found desirable in this instance to provide such fulcrum-point in the inner end of a separate longitudinal rod B', which is adjustably clamped within an axial bore of the shaft B at the opposite end thereof from the rod G. The inner end of this rod B' is provided with a slot $b'$, into which the inner ends of the levers F project, as shown. The rod B' is in this instance secured within the shaft by means of a sleeve $b^2$, which has a screw-threaded engagement with the reduced outer end of the rod and which is itself secured within a counterbore in the end of the shaft by a clamping-ring $b^3$, held by screws $b^4$. The outer end $b^5$ of the sleeve $b^2$ is so shaped that a wrench may be applied thereto, and by turning the sleeve to the right or left when the shaft is still the rod may be drawn in or out to secure the desired adjustment of the slot $b'$, within which the inner ends of the levers F are fulcrumed. A check-nut $b^6$ on the outer end of the rod B' serves to lock the parts in their adjusted position.

It will be obvious that in the construction thus described the clutch-levers F and links F', the sleeve E, the connecting-bar $f'$, and the rods G and B' must rotate with the shaft B, and in the present instance where the driving-gear C is rigidly secured to the shaft and normally maintained in constant rotation these parts will also be in constant rotation. It will, however, be understood that a rigid connection between the shaft and driving-gear by which they are held to rotate with each other at all times is not an essential feature of the construction in the form illustrated, since if said gear should be journaled on the shaft the clutch mechanism described would still be operative, the difference being merely that the shaft and the parts of the clutch above referred to would normally not rotate, but would be gradually set in rotation by the friction of the spider D' against the sleeve E, as said spider and its attached drum began to rotate when the clutch was shifted to bring the friction-surfaces $c$ and $d$ into contact. It will also be understood that various other changes may be made in the details of the construction thus described without departing from the broad spirit of the invention.

My improved clutch mechanism is particularly well adapted for use in a hoisting or similar machine having a drum of considerable length, since it will be noticed that such drum serves to inclose and protect or guard the levers and links, while the method of operating the clutch mechanism by a longitudinally-movable rod extending through an axial bore in the shaft permits the drum to be provided with an outer supporting-bearing carried by a spider $D^2$, between which and the spider D' said links and levers have ample room to operate. In the particular construction shown endwise movement of the shaft B within its bearings $a$ is prevented by shoulders $b^7$ $b^8$, which engage the ends of the bearings $a$ and resist the tendency toward endwise movement imparted by the clutch-shifting devices. As herein shown, also, the bearings of the drum on the shaft are lined with bushings $d^4$ of Babbitt or other antifriction metal, and the main bearings $a$ are similarly lined. These features, however, have obviously no connection with the present invention and are merely mentioned to enable all parts of the drawings to be clearly understood.

I claim as my invention—

1. A friction-clutch, comprising driving and driven members mounted on a common shaft and having coacting friction-surfaces, a slidable sleeve on said shaft connected with one of said members against endwise movement relative thereto, levers pivoted to said sleeve with their inner ends engaging fulcrum-points carried by the shaft, and means for shifting said levers to move the sleeve endwise of the shaft and force the driving and driven members into contact, or release them therefrom.

2. A friction-clutch, comprising driving and driven members mounted on a common shaft and having coacting friction-surfaces, a slidable sleeve on said shaft connected with one of said members against endwise movement relatively thereto but free to rotate independently thereof, levers pivoted to said sleeve and fulcrumed at their inner ends within the shaft, links connected at their inner ends to each other and at their outer ends to the outer ends of the levers, and means for moving the connected ends of the links at will to move the sleeve endwise of the shaft and force the driving and driven members into contact or release them therefrom.

3. A friction-clutch, comprising driving and driven members mounted on a common shaft and having coacting friction-surfaces, a slidable sleeve on said shaft connected with one of said members against endwise movement relatively thereto, levers pivoted to said sleeve and fulcrumed at their inner ends within the shaft, links connected to the outer ends of the levers, a longitudinally-movable rod mounted within an axial bore of the shaft and extending out of the end of the same, and connections between the inner end of said rod and the inner end of the links whereby endwise movement of the rod will shift the levers to throw the clutch in or out.

4. A friction-clutch, comprising driving and driven members mounted on a common shaft and having coacting friction-surfaces, a slidable sleeve on said shaft connected with one of said members against endwise movement relatively thereto, levers pivoted to said sleeve with their inner ends engaging fulcrum-points carried by the shaft, a longitudinally-movable rod mounted within an axial bore of the shaft and extending out of one end of the same, means for shifting said rod longitudinally within the shaft, and connections between the inner end of the rod and the outer ends of the levers whereby the endwise movement of the rod will throw the clutch in or out.

5. A friction-clutch, comprising driving and driven members mounted on a common shaft and having coacting friction-surfaces, a slidable sleeve on said shaft connected with one of said members against endwise movement relatively thereto, levers pivoted to said sleeve with their inner ends projecting through slots in the shaft into an axial bore therein, a longitudinally-adjustable rod clamped within said axial bore and having at its inner end a slot within which the inner ends of the levers are received and fulcrumed, and means for shifting said levers to throw the clutch in or out.

6. A friction-clutch mechanism, comprising a hollow shaft, driving and driven members mounted on said shaft and having coacting friction-surfaces, a slidable sleeve on said shaft connected with one of said members against endwise movement relatively thereto, levers pivoted to said sleeve with their inner ends projecting through slots into the hollow shaft, a longitudinally-adjustable rod clamped within one end of said hollow shaft and having at its inner end a slot within which the inner ends of the levers are received and fulcrumed, pivotal links connected at their outer ends to the outer ends of the levers, a longitudinally-movable rod mounted within the other end of the hollow shaft, connections between the inner end of the latter rod and the inner ends of the links, and means for moving the latter rod endwise of the shaft to throw the clutch in or out.

7. A friction-clutch, comprising a driving and driven part mounted on a common shaft, one of said parts being rigidly fixed to the shaft and the other part being free to rotate on the shaft, a slidable sleeve on the shaft connected with the freely-rotating part against endwise movement relatively thereto but free to rotate independently thereof, levers pivoted to said sleeve and fulcrumed at their inner ends within the shaft, links connected at their outer ends to the outer ends of the levers and having their inner ends connected to each other, and means extending out through an axial bore in the shaft for shifting the connected inner ends of the links endwise of the shaft to move the sleeve endwise of the shaft and force the driving and driven parts into contact or release them therefrom.

8. The combination with a hollow shaft having a driving-gear rigidly mounted thereon, of a drum revolubly supported on the shaft by separate spiders journaled thereon, coacting friction-surfaces on the drum and gear, a slidable sleeve having a peripheral flange inclosed within an annular groove of one of the spiders, levers pivoted to said sleeve and fulcrumed at their inner ends within the shaft, links pivoted to the outer ends of the levers, a longitudinally-movable rod mounted in an axial bore of the shaft, there being slots in the shaft opening into said bore between the separated bearings of the drum-spiders, a cross-bar connected to the inner end of said rod and projecting through said slots, and pivotal connections between said cross-bar and the inner ends of the links.

9. The combination with the supporting-frame A and shaft B having the gear C keyed thereto, of the drum D having the spider D' and revolubly mounted on the shaft, coacting friction-surfaces on said spider and gear, sleeve E revolubly engaging the spider but movable endwise therewith, levers F pivoted to the sleeve and projecting through slots in the shaft B into a slot $b'$ in the adjustable rod B', links F' pivoted to the levers, cross-bar $f'$ extending through slots in the shaft and pivotally connected to the links, longitudinally-movable rod G, and lever mechanism for shifting said rod to throw the clutch in or out.

10. A friction-clutch, comprising driving and driven members mounted on a hollow shaft B and having coacting friction-surfaces, slidable sleeve E connected with one of said members against endwise movement relatively thereto, levers F pivoted to sleeve E, with their inner ends projecting through slots $b$ into the shaft and into a slot $b'$ in a rod B' within said shaft, means for adjusting said rod comprising the rotary sleeve $b^2$ having a screw-thread engagement with the rod and held by collar $b^3$ within a counterbore in the shaft, and a toggle mechanism for shifting the levers to throw the clutch in or out.

In testimony that I claim the foregoing as my invention I affix my signature hereto, in the presence of two subscribing witnesses, this 7th day of May, 1898.

FRANK G. HOBART.

Witnesses:
B. P. ELDRED,
M. E. BAKER.